(12) United States Patent
Swender

(10) Patent No.: US 7,837,253 B1
(45) Date of Patent: Nov. 23, 2010

(54) WIND DEFLECTOR FOR MOTORCYCLE

(76) Inventor: James A. Swender, 968 Cedar Crest Rd., Cedar Rapids, IA (US) 52403

( * ) Notice: Subject to any disclaimer, the term of this patent is extended or adjusted under 35 U.S.C. 154(b) by 171 days.

(21) Appl. No.: 12/366,785

(22) Filed: Feb. 6, 2009

(51) Int. Cl.
B62J 17/06 (2006.01)
(52) U.S. Cl. .................................. 296/180.1; 296/78.1
(58) Field of Classification Search ............... 296/77.1, 296/78.1, 180.1; 180/68.1
See application file for complete search history.

(56) References Cited

U.S. PATENT DOCUMENTS

| | | | | |
|---|---|---|---|---|
| 4,089,556 A | * | 5/1978 | Stobar | 296/78.1 |
| 4,130,315 A | * | 12/1978 | Shields | 296/78.1 |
| 4,911,494 A | * | 3/1990 | Imai et al. | 296/78.1 |
| 4,964,484 A | * | 10/1990 | Buell | 296/78.1 |
| 6,042,171 A | * | 3/2000 | Hesse | 296/78.1 |
| 6,120,083 A | * | 9/2000 | Gunther | 296/78.1 |
| 7,178,858 B1 | * | 2/2007 | Hesse | 296/78.1 |
| 7,347,485 B1 | * | 3/2008 | Saunders | 296/78.1 |
| 7,357,439 B1 | * | 4/2008 | Morin | 296/78.1 |
| 2006/0113133 A1 | * | 6/2006 | Berkovic et al. | 180/219 |

* cited by examiner

Primary Examiner—Lori L Lyjak
(74) Attorney, Agent, or Firm—Allan L. Harms; Shuttleworth & Ingersoll, PLC

(57) ABSTRACT

A wind deflector for the front fairing of a motorcycle mounts to the fairing above the headlight. The wind deflector includes a deflection surface with a top region and side regions which slope upwardly and rearwardly from a rounded leading edge which stands off from the fairing. The deflection surface is joined to an arched rounded trailing edge by a shallow concavity. The trailing edge is above and behind the leading edge and also stands off from the fairing.

20 Claims, 5 Drawing Sheets

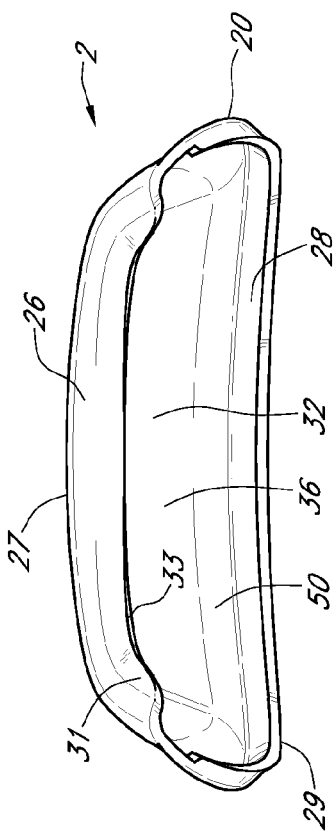
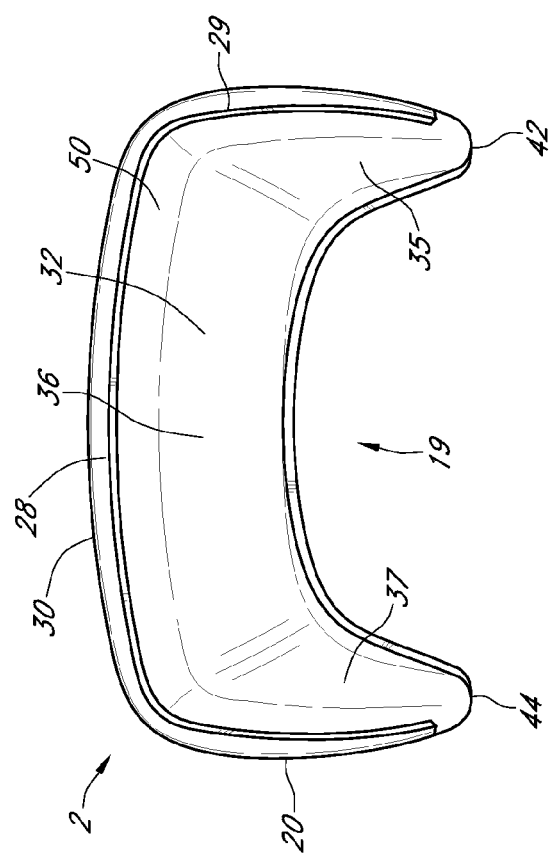
FIG. 6
FIG. 7

WIND DEFLECTOR FOR MOTORCYCLE

BACKGROUND OF THE INVENTION

Open cockpit vehicles such as motorcycles expose the operator to a variety of elements including airflow, rain, insects and dust. The flow of air impacts the user of the vehicle, especially at high speeds. This wind resistance may lead to the tiring of the operator as well as leaving the operator susceptible to impacts from insects and other objects in the air stream.

Various deflectors, shields and fairings have been implemented to protect the operator from the forces associated with the operation of open cockpit vehicles. A common shield utilized for such protection is a transparent windshield attached to a part of the open cockpit vehicle. For a motorcycle, specifically, the windshield is typically fastened in some manner to a fairing which shields the torso of the motorcycle operator.

Deflectors and shields may also be used in a variety of other places to relieve the forces of airflow on other portions of a motorcycle and the operator. For example, U.S. Pat. No. 7,178,858 discloses a deflector assembly for a motorcycle that is placed to the left and right of the fuel tank of most motorcycles.

Other solutions have included placing deflectors or windshields at a height which is near the head of the operator. U.S. Pat. No. 4,130,315 discloses a number of deflectors including a windshield located above the handlebars to shield the operator's face.

The use of bulky wind deflectors diminishes the overall aesthetic appearance of the open cockpit vehicle. In addition, large wind deflectors may decrease visibility and increase the wind resistance which in turn increases the load on the engine of the motorcycle.

SUMMARY OF THE INVENTION

This invention provides a wind deflector which may be attached by adhesive to the motorcycle fairing of a touring motorcycle equipped with a fairing. The invention is preferably made from a molded polymer and the rear of the wind deflector conforms to the convex form of the motorcycle fairing. The complementary shape provides for an aesthetically pleasing appearance that does not detract from the original appearance of the fairing.

Applicant's invention can be molded to fit the existing contours of the fairing of a motorcycle. The ability to attach the invention with adhesives also contributes to an aesthetically pleasing wind deflector. The shape of the invention then provides the operator greater relief from airflow pressure and objects carried in the air stream. The invention may be used in combination with existing factory-installed deflectors such as fairings and windshields to increase the vehicle's ability to reduce the amount of airflow impacting the operator.

The invention includes a hollow unitary body which is generally arch shaped. The body includes a trailing rounded edge which follows the top and side edges of the body. The rounded edge is joined with a rear facing ridge which abuts the front surface of the existing fairing and may be adhesively fixed to the fairing. On the opposite side of the rounded edge from the rear facing ridge is a deflection surface which transitions from a shallow concave region to a pronounced protruding region. The protruding region is inclined at approximately forty degrees to the direction of travel of the motorcycle. The protruding region of the deflection surface terminates at the leading edge of the body which is aerodynamically rounded. A lower rear directed wall is joined to the leading edge and terminates in a contoured rear facing edge which conforms to the topography of the fairing near the cowling of the headlight. The body creates an arch which overlies and partially surrounds the headlight of the motorcycle.

The invention reduces airflow on the operator of an open cockpit vehicle through the rear sloping protruding region and the concave region. The concave region is located on the upper portion of the invention. The slope of the concavity at its connection to the outer rounded edge affects the ability of the invention to deflect airflow away from the operator. In addition, the slope of the concave region affects the drag on the vehicle and the overall aerodynamics of the vehicle.

In the preferred embodiment, the invention is mounted to the fairing of the motorcycle just above the headlight. The invention cooperates with the fairing and the windshield to enhance the amount of airflow deflected away from the operator by the invention.

A primary object of the invention is to provide an improved wind deflector for a motorcycle which reduces the amount of airflow striking an operator while operating the vehicle.

Another object of the invention is to provide a wind deflector that conforms to the existing exterior shape of the front fairing of the motorcycle.

A further object of the invention is to provide a wind deflector that is aesthetically pleasing in appearance. An additional object of the invention is to provide additional wind deflection for the operator of the motorcycle without modifying an existing fairing.

These and other objects of the invention will be apparent from the detailed description which follows.

DESCRIPTION OF THE DRAWINGS

FIG. 6 is a rear elevation view of the wind deflector of FIG. 2.

FIG. 7 is a bottom view of the wind deflector of FIG. 2.

DETAILED DESCRIPTION OF THE INVENTION

Figure 1:
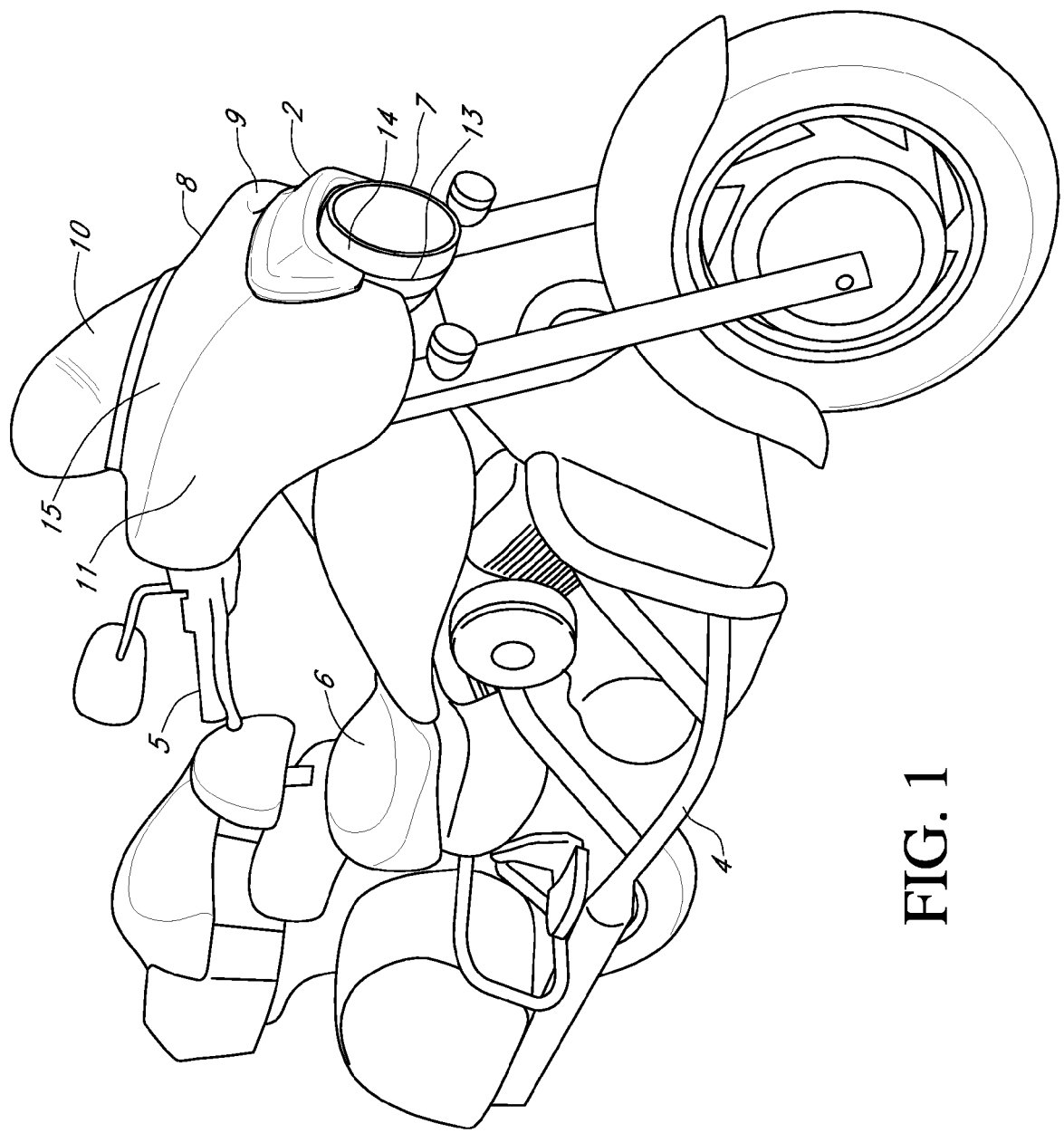
FIG. 1 is a front perspective of a motorcycle with the wind deflector attached to the fairing.
Figure 3:
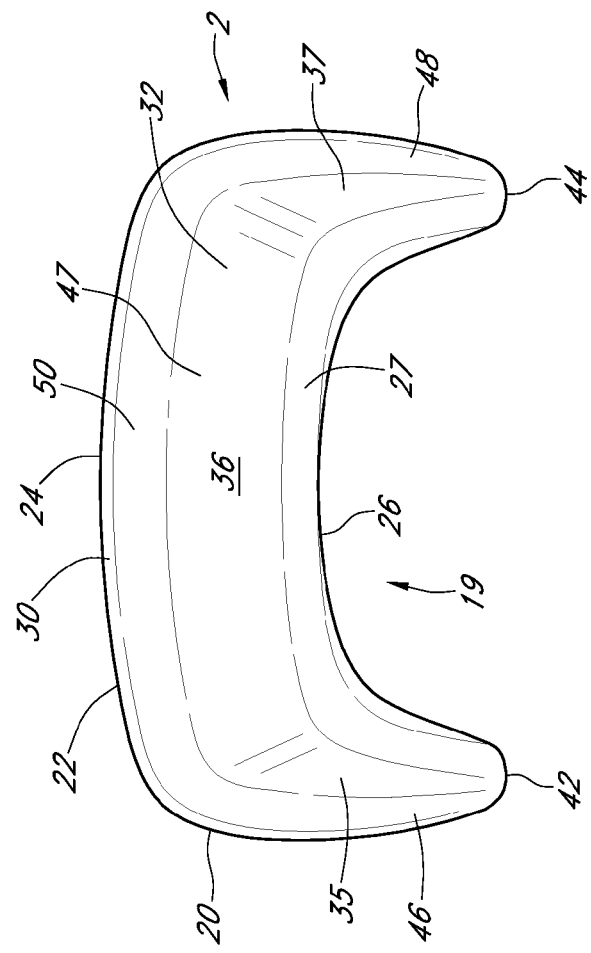
FIG. 3 is a front elevation of the wind deflector of FIG. 2.

Referring to the drawings and specifically to FIG. 1, the wind deflector 2 may be seen attached to fairing 8 of motorcycle 4. Motorcycle 4 contains the features of a typical open cockpit motorcycle including seat 6, handlebars 5 and headlight 7. Fairing 8 and windshield 10 provide the user partial protection from airflow and objects in the air stream while the motorcycle is operated on a roadway.

The wind deflector 2 is preferably mounted on the fairing 8 immediately above and partially surrounding the headlight 7. Specifically the wind deflector 2 is mounted over and adjacent to the upper part of cowling 14 of the headlight 7. Wind deflector 2 is approximately ten to twenty inches in width and five and a half inches to eleven and a half inches in overall height. Preferably wind deflector 2 is eleven to twelve inches in width and six to seven inches in overall height. Leading edge 27 of wind deflector 2 protrudes forward of fairing 8 approximately three to four inches and preferably approximately three and three-quarters inches. The wind deflector 2 may be molded to fit a variety of differently shaped fairings for motorcycles.

Wind deflector 2 may be attached to the fairing 8 via several methods. The preferred method of attachment is by use of an adhesive that may be applied to the rear surfaces of the wind deflector 2 that abut the surfaces of the fairing 8. Such an attachment makes for an aesthetically pleasing appearance as well as a seamless connection. However the wind deflector 2 alternatively may be mounted with screws or other mounting hardware. Alternatively, the wind deflector 2 may be formed as an integral part of fairing 8.

As a user drives the motorcycle 4 at highway speeds, air rolls over the wind deflector 2. As air strikes deflection surface 32 and trailing edge 30, the air stream is diverted away from the user along with the insects and other contents of the air stream.

Now referring to FIGS. 2-7, the wind deflector 2 may be seen in greater detail. The wind deflector 2 is preferably formed of a suitable rigid polymeric material as a single unit by an appropriate plastic molding technique. The invention includes a hollow unitary body 20 which is generally arch shaped, that is, it is generally shaped in an inverted U, and preferably body 20 defines a proscenium arch.

Body 20 includes an outer perimeter 22 which includes an upper portion 24 and a lower portion 26. Upper portion 24 of outer perimeter 22 and lower portion 26 each generally define an arch or horseshoe shape and join at rounded bottom edges 42, 44 of legs 46, 48. More particularly, upper portion 24 of outer perimeter 22 and lower portion 26 thereof each generally define a proscenium arch. Legs 46, 48 are joined by transverse region 47 to form body 20. Legs 46, 48 are integrally formed with transverse region 47 as by polymeric molding and are separated preferably approximately seven to eight inches to allow legs 46, 48 to extend downward along opposing sides of the upper part of the headlight 7 (see FIG. 1). Legs 46, 48 depend substantially perpendicularly from transverse region 43

The body 20 includes an outer rounded trailing edge 30 which extends along and adjacent the outer perimeter 22, that is, along transverse region 47 and legs 46, 48 of the body 20. The trailing edge 30 is joined with a rearward extending ridge 28 which abuts the central region 15 and side regions 9, 11 of the fairing 8 and may be adhesively fixed to the fairing 8. On the opposite side of the trailing edge 30 from the rear extending ridge 28 is a deflection surface 32 which also is arch shaped and predominantly protrudes forward in the direction of travel of the motorcycle. Deflection surface 32 comprises an upper segment 36 and opposing side segments 35, 37 which depend substantially perpendicularly from upper segment 36.

Transition region 50 defines a shallow concavity which defines an arch and interconnects trailing edge 30 along the entire extent thereof to protruding segments 35, 36, 37 of deflection surface 32. Trailing edge 30 surrounds deflection surface 32 on three sides, that is, at the top and at each opposing side thereof. Deflection surface 32 protrudes forward and downward toward and terminates at horseshoe shaped leading edge 27 of body 20, leading edge 27 being aerodynamically rounded. The portion of trailing edge 30 along transverse region 47 of body 20 is disposed above leading edge 27. The side portions of trailing edge 30 along legs 46, 48 is outside the corresponding lengths of leading edge 27.

A lower rearwardly directed wall 31 is joined to leading edge 27 and terminates in a contoured edge 33 which conforms to the topography of fairing 8 near headlight 7. Deflection surface 32 slopes rearward from leading edge 27 at approximately twenty-five to sixty degrees to the direction of travel of the motorcycle and preferably at approximately thirty five to forty degrees to the direction of travel of the motorcycle. Protruding segment 36 inclines from leading edge 27 to trailing edge 30 while side protruding segments 35, 37 slope outward from leading edge 27 toward trailing edge 30. The body 20 defines an arched cavity 19 which preferably overlies and partially surrounds the headlight 7 of the motorcycle 4. Cavity 19 approximates a proscenium arch.

Trailing edge 30 is joined to a rear extending ridge 28 which has a terminal edge 29 which is shaped to abut conformingly to the motorcycle fairing 8. Preferably the terminal edge 29 of rear extending ridge 28 is adhered to the motorcycle fairing 8 by adhesive or other established attachment means which permit continuous bonding of rear extending ridge 28 to central region 15 and side regions 9, 11 of fairing 8.

Figure 2:
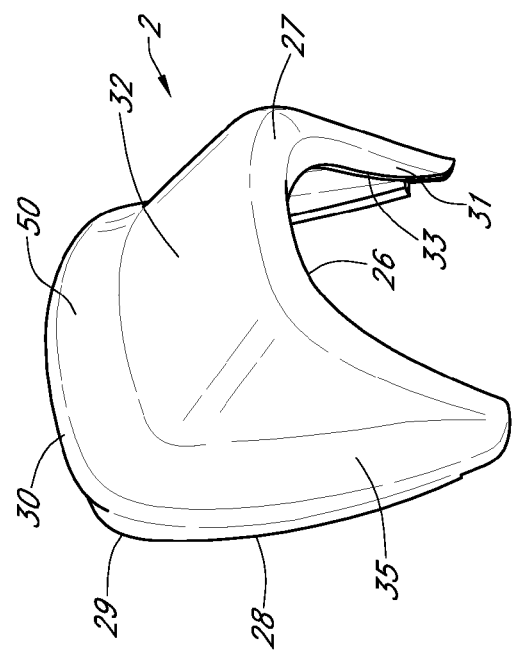
FIG. 2 is a front left perspective of the wind deflector of the present invention.
Figure 5:
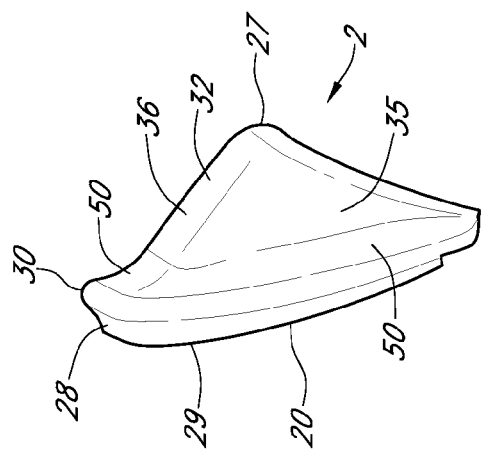
FIG. 5 is a right side view of the wind deflector of FIG. 2.
Figure 4:
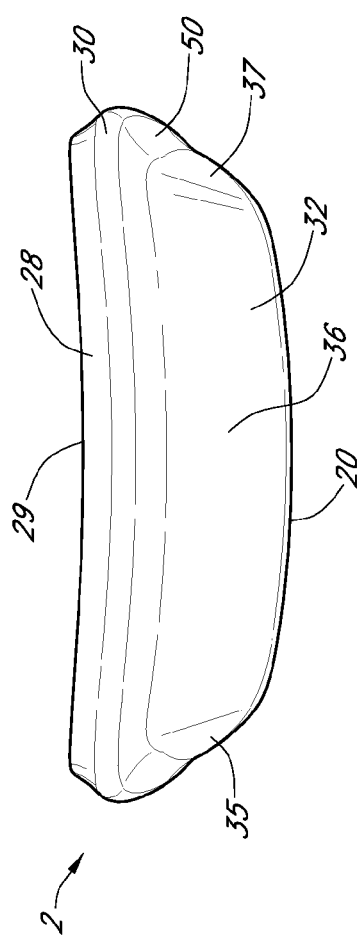
FIG. 4 is a top view of the wind deflector of FIG. 2.

As can be seen in FIGS. 2 and 7, the terminal edge 29 of rear extending ridge 28 is generally concave in shape. The concavity of the terminal edge 29 may be molded to precisely fit the contour of a particular motorcycle fairing 8.

FIGS. 6 and 7 disclose that body 20 in a hollow shell preferably made of a semi-rigid polymer.

Figure 8:
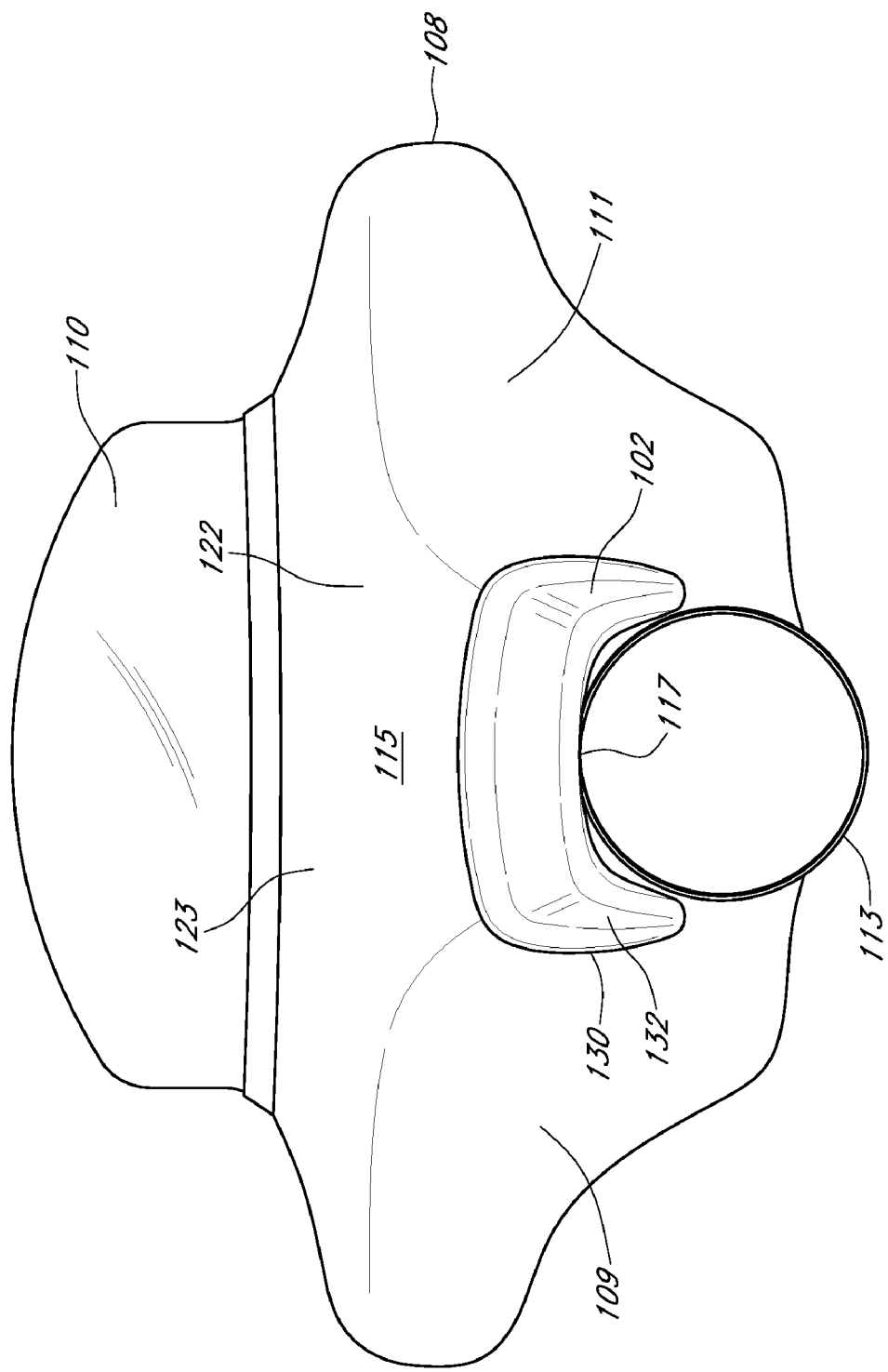
FIG. 8 is a front elevation view of a front fairing for a motorcycle in accordance with an alternative embodiment of the invention.

In an alternate embodiment shown in FIG. 8, the wind deflector 102 may be incorporated into a fairing 108. The fairing 108 comprises a central region 115 and side regions 109, 111 on opposing lateral sides of central region 115. Side regions 109, 111 are formed integrally with central region 115. Central region 115 comprises a shallow S-curved front surface 122 with the concave portion 123 thereof adjacent the attachment of windshield 110 to fairing 108. Each side region 109, 111 recesses downward and rearward from central region 115. A headlight surrounding ring 113 depends from lower edge 117 of fairing 108 but is integrally formed with central region 115 and side regions 109, 111. Wind deflecting protrusion 102 is integrally formed with central region 115 and side regions 109, 111 and protrudes from parts of central region 115 and side regions 109, 111. Wind deflecting protrusion 102 includes rounded edge 130 which stands off a short distance from front surface 122 and from the front surface of side regions 109, 111. Rounded edge 130 surrounds deflection surface 132 on its top and opposing sides. Deflection surface 132 and is shaped identically to deflection surface 32 of wind deflector 2 shown in FIGS. 1 through 5. Leading edge 127 bounds deflection surface 132 at its lower edge and stands off from front surface 122.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention and its practical application to enable one skilled in the art to utilize the invention in various embodiments and with various modifications as are suited to the particular use contemplated. It is intended that the scope of the invention be defined by the claims appended hereto, and by their equivalents.

The invention claimed is:

1. In a motorcycle having an air deflecting fairing on a front thereof, the improvement comprising:
   an integral body mounted to a front surface of the fairing adjacent a headlight of the motorcycle,
   the body of generally arched shape,
   the body further comprising a deflection surface, a trailing edge and a leading edge, a central length of the trailing edge disposed above a central length of the leading edge, the deflection surface bounded by the leading edge and the trailing edge, the deflection surface including a sloped region, the sloped region sloping rearward from the leading edge to the trailing edge at approximately twenty five degrees to sixty degrees from a direction of travel of the motorcycle, a rearwardly directed ridge joined to the leading edge and the trailing edge, the rearwardly directed ridge having a terminal edge conforming to the front surface of the fairing, each of the leading edge and trailing edge being rounded.

2. The improvement of claim 1 wherein each of the trailing edge and the leading edge define an arch.

3. The improvement of claim 1 wherein each of the trailing edge and the leading edge substantially define a proscenium arch.

4. The improvement of claim 1 wherein the body comprises a transverse section and downward depending leg sections joined to opposing ends of the transverse section.

5. The improvement of claim 1 wherein an elongate shallow concavity interconnects the inclining region to the trailing edge.

6. The improvement of claim 1 wherein the sloped region of the deflection surface includes a central segment and side segments depending from opposing sides of the central segment, the side segments inclining rearward at approximately twenty-five to sixty degrees from the direction of the travel of the motorcycle.

7. The improvement of claim 1 wherein each of the trailing edge and the leading edge substantially define a proscenium arch, the body comprising a transverse section and downward depending leg sections joined to opposing ends of the transverse section, an arched shallow concavity interconnecting the inclining region to the trailing edge.

8. The improvement of claim 7 wherein the sloped region of the deflection surface includes a central segment and side segments depending from opposing sides of the central segment, the side portions inclining rearward at approximately twenty-five to sixty degrees from the direction of the travel of the motorcycle.

9. The improvement of claim 1 wherein the body is integrally formed with the fairing.

10. An air deflector for a fairing of a motorcycle comprises an arch shaped body, the body substantially smaller than the fairing, the body including a rear edge conforming to a contour of a front surface of the fairing, the body further comprising an elongate rounded leading element and an elongate rounded trailing element, a central length of the trailing element disposed above a central length of the leading element, each of the trailing element and the leading element spaced apart from the front surface of the fairing, the body further comprising a deflecting element bounded by the leading element and the trailing element, the deflecting element including a sloping region, the sloping region sloping from the leading element to the trailing element, a shallow concavity joining the trailing element to the sloping region of the deflecting element.

11. The air deflector for a fairing of a motorcycle of claim 10 wherein the body generally defines a proscenium arch.

12. The air deflector for a fairing of a motorcycle of claim 10 wherein the body comprises a transverse segment and opposing side segments depending from opposing sides of the transverse segment.

13. The air deflector for a fairing of a motorcycle of claim 10 wherein the trailing element substantially defines a proscenium arch.

14. The air deflector for a fairing of a motorcycle of claim 10 wherein the arched shallow concavity defines a proscenium arch.

15. The air deflector for a fairing of a motorcycle of claim 10 wherein the deflecting element comprises a central sloped region and opposing side regions depending from opposing sides of the central sloped region, the central sloped region inclining rearward from the leading edge at approximately twenty-five to sixty degrees.

16. The air deflector for a fairing of a motorcycle of claim 15 wherein the opposing side regions of the deflecting element sloping outward and rearward from the leading edge at approximately twenty-five to sixty degrees.

17. The air deflector for a fairing of a motorcycle of claim 15 wherein the central sloped region of the deflecting element inclines rearward from the leading edge at approximately thirty-five to forty-five degrees, the opposing side regions of the deflecting element sloping outward and rearward from the leading edge at approximately thirty-five to forty-five degrees.

18. The air deflector for a fairing of a motorcycle of claim 15 wherein the air deflector and the fairing are formed as an integral unit.

19. A fairing for a motorcycle comprising a central surface extending from a headlight of the motorcycle to a windshield thereof, first and second side surfaces depending from the central surface on opposing sides thereof, the first and second side surfaces extending laterally rearward from the central surface, the central surface including a protruding section at a lower region thereof, the protruding section comprising a leading rolled edge, the leading rolled edge adjacent to but spaced apart from the headlight, the protruding section further comprising a first surface spaced apart from the headlight and joined to the leading rolled edge, the first surface comprising an upper region and side regions depending from the upper region, the upper regions and side regions sloping outward from a forward direction of travel of the motorcycle,
a trailing rolled edge joined to the upper region and side regions of the protruding section,
the trailing rolled edge joined to the protruding section by a shallow concavity extending therealong,
the trailing rolled edge generally defining an arch,
the trailing rolled edge spaced apart a small distance from the central surface and from the first and second side surfaces of the fairing.

20. The fairing of claim 19 wherein
the protruding surface comprises a transverse section and leg sections joined at opposing ends of the transverse section,
the transverse section extends over the headlight,
the leg sections extend downward from the transverse section on opposing sides of the headlight.

* * * * *